United States Patent
Jiang et al.

(10) Patent No.: US 10,834,132 B2
(45) Date of Patent: *Nov. 10, 2020

(54) IMPLEMENTING AND OPTIMIZING SECURE SOCKET LAYER INTERCEPT

(71) Applicant: A10 NETWORKS, INC., San Jose, CA (US)

(72) Inventors: Xuyang Jiang, Saratoga, CA (US); Ali Golshan, Palo Alto, CA (US)

(73) Assignee: A10 Networks, Inc., San Jose, CA (US)

(*) Notice: Subject to any disclaimer, the term of this patent is extended or adjusted under 35 U.S.C. 154(b) by 131 days.

This patent is subject to a terminal disclaimer.

(21) Appl. No.: 16/044,893

(22) Filed: Jul. 25, 2018

(65) Prior Publication Data

US 2020/0092329 A1 Mar. 19, 2020

Related U.S. Application Data

(63) Continuation of application No. 14/622,840, filed on Feb. 14, 2015, now Pat. No. 10,063,591.

(51) Int. Cl.
*H04L 29/06* (2006.01)

(52) U.S. Cl.
CPC ........ *H04L 63/168* (2013.01); *H04L 63/0464* (2013.01); *H04L 63/1416* (2013.01)

(58) Field of Classification Search
CPC . H04L 63/1416; H04L 63/145; H04L 63/168; H04L 63/0464
See application file for complete search history.

(56) References Cited

U.S. PATENT DOCUMENTS

| 4,001,819 A | 1/1977 | Wise |
| 4,780,905 A | 10/1988 | Cruts et al. |

(Continued)

FOREIGN PATENT DOCUMENTS

| TW | 477140 | 2/2002 |
| TW | 574655 | 2/2004 |

(Continued)

OTHER PUBLICATIONS

Annexstein, et al., "Indexing Techniques for File Sharing in Scalable Peer-to-Peer Networks," IEEE, 2002, pp. 10-15.

(Continued)

*Primary Examiner* — Ali S Abyaneh
(74) *Attorney, Agent, or Firm* — Keith Kline; The Kline Law Firm PC

(57) ABSTRACT

Provided are methods and systems for intercepting encrypted data packets. A system for intercepting encrypted data packets includes a first device and a second device. The first device serves a client-side data traffic associated with a client device and the second device serves a server-side data traffic associated with a server. The first device is configured to intercept at least one encrypted data packet. The first device is further configured to decrypt the encrypted packet to produce at least one decrypted data packet. The first device provides the decrypted data packet to one or more monitoring devices for inspection of the decrypted data packet. The second device is configured to receive, from the one or more monitoring devices, the at least one decrypted data packet. The second device is further operable to re-encrypt the decrypted data packet to produce the at least one encrypted data packet.

17 Claims, 9 Drawing Sheets

(56) References Cited

U.S. PATENT DOCUMENTS

| | | |
|---|---|---|
| 5,101,402 A | 3/1992 | Chiu et al. |
| 5,163,088 A | 11/1992 | LoCascio |
| 5,359,659 A | 10/1994 | Rosenthal |
| 5,414,833 A | 5/1995 | Hershey et al. |
| 5,511,122 A | 4/1996 | Atkinson |
| 5,584,023 A | 12/1996 | Hsu |
| 5,684,875 A | 11/1997 | Ellenberger |
| 5,757,908 A | 5/1998 | Cooper et al. |
| 5,805,801 A | 9/1998 | Holloway et al. |
| 5,835,727 A | 11/1998 | Wong et al. |
| 5,892,903 A | 4/1999 | Klaus |
| 5,905,859 A | 5/1999 | Holloway et al. |
| 5,940,002 A | 8/1999 | Finn et al. |
| 5,960,177 A | 9/1999 | Tanno |
| 6,006,272 A | 12/1999 | Aravamudan et al. |
| 6,170,061 B1 | 1/2001 | Beser |
| 6,185,681 B1 | 2/2001 | Zizzi |
| 6,205,115 B1 | 3/2001 | Ikebe et al. |
| 6,219,706 B1 | 4/2001 | Fan et al. |
| 6,237,036 B1 | 5/2001 | Ueno et al. |
| 6,249,866 B1 | 6/2001 | Brundrett et al. |
| 6,259,789 B1 | 7/2001 | Paone |
| 6,347,376 B1 | 2/2002 | Attwood et al. |
| 6,363,486 B1 | 3/2002 | Knapton, III |
| 6,449,651 B1 | 9/2002 | Dorfman et al. |
| 6,505,192 B1 | 1/2003 | Godwin et al. |
| 6,539,435 B2 | 3/2003 | Bolmarcich et al. |
| 6,553,005 B1 | 4/2003 | Skirmont et al. |
| 6,578,147 B1 | 6/2003 | Shanklin et al. |
| 6,594,780 B1 | 7/2003 | Shen et al. |
| 6,687,746 B1* | 2/2004 | Shuster ............. H04L 29/12066 707/999.005 |
| 6,715,081 B1 | 3/2004 | Attwood et al. |
| 6,732,279 B2 | 5/2004 | Hoffman |
| 6,735,702 B1 | 5/2004 | Yavatkar et al. |
| 6,754,832 B1 | 6/2004 | Godwin et al. |
| 6,757,822 B1 | 6/2004 | Feiertag et al. |
| 6,779,117 B1 | 8/2004 | Wells |
| 6,973,040 B1 | 12/2005 | Ricciulli |
| 6,988,106 B2 | 1/2006 | Enderwick et al. |
| 7,092,357 B1 | 8/2006 | Ye |
| 7,194,766 B2 | 3/2007 | Noehring et al. |
| 7,200,760 B2 | 4/2007 | Riebe et al. |
| 7,221,757 B2 | 5/2007 | Alao |
| 7,234,161 B1 | 6/2007 | Maufer et al. |
| 7,277,963 B2 | 10/2007 | Dolson et al. |
| 7,372,809 B2 | 5/2008 | Chen et al. |
| 7,392,241 B2 | 6/2008 | Lin et al. |
| 7,409,712 B1 | 8/2008 | Brooks et al. |
| 7,418,733 B2 | 8/2008 | Connary et al. |
| 7,478,429 B2 | 1/2009 | Lyon |
| 7,533,409 B2 | 5/2009 | Keane et al. |
| 7,543,052 B1 | 6/2009 | Cesa Klein |
| 7,577,833 B2 | 8/2009 | Lai |
| 7,596,695 B2 | 9/2009 | Liao et al. |
| 7,620,733 B1 | 11/2009 | Tzakikario et al. |
| 7,665,138 B2 | 2/2010 | Song et al. |
| 7,739,494 B1 | 6/2010 | McCorkendale et al. |
| 7,823,194 B2 | 10/2010 | Shay |
| 7,845,004 B2 | 11/2010 | Bardsley et al. |
| 7,925,766 B2 | 4/2011 | Jayawardena et al. |
| 7,953,855 B2 | 5/2011 | Jayawardena et al. |
| 8,010,469 B2 | 8/2011 | Kapoor et al. |
| 8,089,871 B2 | 1/2012 | Iloglu et al. |
| 8,220,056 B2 | 7/2012 | Owens, Jr. |
| 8,239,670 B1 | 8/2012 | Kaufman et al. |
| 8,276,203 B2 | 9/2012 | Nakhre et al. |
| 8,286,227 B1 | 10/2012 | Zheng |
| 8,301,802 B2 | 10/2012 | Wei et al. |
| 8,375,453 B2 | 2/2013 | Jackson et al. |
| 8,448,245 B2 | 5/2013 | Banerjee et al. |
| 8,478,708 B1 | 7/2013 | Larcom |
| 8,555,388 B1* | 10/2013 | Wang ................. H04L 63/1416 726/23 |
| 8,595,845 B2 | 11/2013 | Basavapatna et al. |
| 8,719,446 B2 | 5/2014 | Spatscheck et al. |
| 8,800,034 B2 | 8/2014 | McHugh et al. |
| 8,813,228 B2 | 8/2014 | Magee et al. |
| 8,832,832 B1 | 9/2014 | Visbal |
| 8,881,284 B1 | 11/2014 | Gabriel |
| 8,948,380 B2 | 2/2015 | Goto |
| 9,129,116 B1 | 9/2015 | Wiltzius |
| 9,130,996 B1* | 9/2015 | Martini ............... G06F 3/04842 |
| 9,203,851 B1* | 12/2015 | Wang .................. H04L 63/1408 |
| 9,215,208 B2 | 12/2015 | Fraize et al. |
| 9,245,121 B1 | 1/2016 | Luo et al. |
| 9,246,926 B2 | 1/2016 | Erlingsson et al. |
| 9,294,503 B2 | 3/2016 | Thompson et al. |
| 9,300,623 B1 | 3/2016 | Earl et al. |
| 9,537,886 B1 | 1/2017 | Gareau |
| 9,571,465 B1 | 2/2017 | Sharifi Mehr et al. |
| 9,584,318 B1 | 2/2017 | Yang et al. |
| 9,722,918 B2 | 8/2017 | Oshiba |
| 9,838,358 B2* | 12/2017 | Dickinson, III ........ H04L 51/12 |
| 9,838,425 B2 | 12/2017 | Jalan et al. |
| 9,860,271 B2 | 1/2018 | Thompson et al. |
| 9,912,555 B2 | 3/2018 | Oshiba |
| 2001/0042204 A1 | 11/2001 | Blaker et al. |
| 2002/0087708 A1 | 7/2002 | Low et al. |
| 2002/0108059 A1 | 8/2002 | Canion et al. |
| 2002/0165912 A1 | 11/2002 | Wenocur et al. |
| 2002/0188839 A1 | 12/2002 | Noehring et al. |
| 2003/0023846 A1 | 1/2003 | Krishna et al. |
| 2003/0023876 A1 | 1/2003 | Bardsley et al. |
| 2003/0028585 A1 | 2/2003 | Yeager et al. |
| 2003/0035547 A1* | 2/2003 | Newton ............... H04L 63/0485 380/279 |
| 2003/0061507 A1 | 3/2003 | Xiong et al. |
| 2003/0069973 A1 | 4/2003 | Ganesan et al. |
| 2003/0123667 A1 | 7/2003 | Weber et al. |
| 2003/0196081 A1 | 10/2003 | Savarda et al. |
| 2003/0200456 A1 | 10/2003 | Cyr et al. |
| 2004/0008711 A1 | 1/2004 | Lahti et al. |
| 2004/0054807 A1 | 3/2004 | Harvey et al. |
| 2004/0057579 A1 | 3/2004 | Fahrny |
| 2004/0059951 A1 | 3/2004 | Pinkas et al. |
| 2004/0059952 A1 | 3/2004 | Newport et al. |
| 2004/0091114 A1 | 5/2004 | Carter et al. |
| 2004/0093524 A1 | 5/2004 | Sakai |
| 2004/0111635 A1 | 6/2004 | Boivie et al. |
| 2004/0148520 A1 | 7/2004 | Talpade et al. |
| 2004/0172538 A1 | 9/2004 | Satoh et al. |
| 2004/0187032 A1 | 9/2004 | Gels et al. |
| 2005/0021999 A1 | 1/2005 | Touitou et al. |
| 2005/0041584 A1 | 2/2005 | Lau et al. |
| 2005/0044068 A1 | 2/2005 | Lin et al. |
| 2005/0044352 A1 | 2/2005 | Pazi et al. |
| 2005/0125684 A1 | 6/2005 | Schmidt |
| 2005/0180416 A1 | 8/2005 | Jayawardena et al. |
| 2005/0193199 A1 | 9/2005 | Asokan et al. |
| 2005/0198099 A1 | 9/2005 | Motsinger et al. |
| 2005/0235145 A1 | 10/2005 | Slick et al. |
| 2005/0257093 A1 | 11/2005 | Johnson et al. |
| 2005/0278527 A1 | 12/2005 | Liao et al. |
| 2006/0056297 A1 | 3/2006 | Bryson et al. |
| 2006/0061507 A1 | 3/2006 | Mohamadi |
| 2006/0137011 A1* | 6/2006 | Kim .................... H04L 63/029 726/22 |
| 2006/0143707 A1 | 6/2006 | Song et al. |
| 2006/0179319 A1 | 8/2006 | Krawczyk |
| 2006/0185014 A1 | 8/2006 | Spatscheck et al. |
| 2006/0230444 A1 | 10/2006 | Iloglu et al. |
| 2006/0265585 A1 | 11/2006 | Lai |
| 2007/0143769 A1 | 6/2007 | Bu et al. |
| 2007/0169194 A1 | 7/2007 | Church et al. |
| 2007/0180513 A1* | 8/2007 | Raz .................... H04L 29/12481 726/12 |
| 2007/0186282 A1 | 8/2007 | Jenkins |
| 2007/0214088 A1 | 9/2007 | Graham et al. |
| 2007/0280114 A1 | 12/2007 | Chao et al. |
| 2007/0283429 A1 | 12/2007 | Chen et al. |
| 2008/0183885 A1 | 7/2008 | Durrey et al. |
| 2008/0256623 A1 | 10/2008 | Worley et al. |
| 2009/0077663 A1 | 3/2009 | Sun et al. |

(56) References Cited

U.S. PATENT DOCUMENTS

| | | |
|---|---|---|
| 2009/0083537 A1 | 3/2009 | Larsen et al. |
| 2009/0168995 A1 | 7/2009 | Banga et al. |
| 2010/0131646 A1 | 5/2010 | Drako |
| 2010/0138921 A1 | 6/2010 | Na et al. |
| 2010/0284300 A1 | 11/2010 | Deshpande et al. |
| 2011/0082947 A1 | 4/2011 | Szeto et al. |
| 2011/0093785 A1 | 4/2011 | Lee et al. |
| 2011/0131646 A1 | 6/2011 | Park et al. |
| 2011/0138177 A1 | 6/2011 | Qiu et al. |
| 2011/0153744 A1 | 6/2011 | Brown |
| 2011/0188452 A1 | 8/2011 | Borleske et al. |
| 2011/0249572 A1 | 10/2011 | Singhal et al. |
| 2011/0282997 A1 | 11/2011 | Prince et al. |
| 2012/0036272 A1 | 2/2012 | El Zur |
| 2012/0042060 A1 | 2/2012 | Jackowski et al. |
| 2012/0096546 A1 | 4/2012 | Dilley et al. |
| 2012/0110472 A1 | 5/2012 | Amrhein et al. |
| 2012/0144461 A1 | 6/2012 | Rathbun |
| 2012/0155274 A1 | 6/2012 | Wang et al. |
| 2012/0159623 A1 | 6/2012 | Choi |
| 2012/0163186 A1 | 6/2012 | Wei et al. |
| 2012/0170753 A1 | 7/2012 | Pandrangi et al. |
| 2012/0173684 A1 | 7/2012 | Courtney et al. |
| 2012/0174196 A1 | 7/2012 | Bhogavilli et al. |
| 2012/0227109 A1 | 9/2012 | Dimuro |
| 2012/0250866 A1 | 10/2012 | Matsuo |
| 2012/0260329 A1 | 10/2012 | Suffling |
| 2012/0266242 A1 | 10/2012 | Yang et al. |
| 2013/0019025 A1 | 1/2013 | Chaturvedi et al. |
| 2013/0103834 A1* | 4/2013 | Dzerve .................. H04L 67/10 709/225 |
| 2013/0139245 A1 | 5/2013 | Thomas |
| 2013/0198845 A1 | 8/2013 | Anvari |
| 2013/0212265 A1 | 8/2013 | Rubio Vidales et al. |
| 2013/0227646 A1 | 8/2013 | Haggerty et al. |
| 2013/0243194 A1 | 9/2013 | Hawkes et al. |
| 2013/0263256 A1 | 10/2013 | Dickinson et al. |
| 2014/0137190 A1 | 5/2014 | Carey et al. |
| 2014/0325648 A1 | 10/2014 | Liu et al. |
| 2014/0344925 A1 | 11/2014 | Muthiah |
| 2015/0033341 A1 | 1/2015 | Schmidtler et al. |
| 2015/0143118 A1 | 5/2015 | Sheller et al. |
| 2015/0220745 A1* | 8/2015 | Nellitheertha .......... G06F 15/16 713/193 |
| 2015/0281177 A1 | 10/2015 | Sun |
| 2016/0036651 A1 | 2/2016 | Sureshchandra et al. |
| 2016/0182509 A1* | 6/2016 | Kantecki ............ H04L 63/0442 713/160 |
| 2016/0226896 A1 | 8/2016 | Bhogavilli et al. |

FOREIGN PATENT DOCUMENTS

| | | |
|---|---|---|
| TW | 576066 | 2/2004 |
| TW | I225999 | 1/2005 |
| TW | I241818 | 10/2005 |
| TW | I252976 | 4/2006 |
| WO | WO1998042108 | 9/1998 |
| WO | WO1999048303 | 9/1999 |
| WO | WO2000062167 | 10/2000 |
| WO | WO2006039529 | 4/2006 |
| WO | WO2014150617 | 9/2014 |
| WO | WO2014151072 | 9/2014 |
| WO | WO2014176461 | 10/2014 |
| WO | WO2015030977 | 3/2015 |

OTHER PUBLICATIONS

Castelluccia, et al., "Improving Secure Server Performance by Re-Balancing SSL/TLS Handshakes," ACM Symposium on Information, Computer and Communications Security, 2006, pp. 26-34.

Dainotti, et al., "Early Classification of Network Traffic through Multi-Classification," International Workshop on Traffic Monitoring and Analysis, 2011, pp. 122-135.

Dainotti, et al., "TIE: A Community-Oriented Traffic Classification Platform," International Workshop on Traffic Monitoring and Analysis, 2009, pp. 64-74.

Ganesan, et al., "YAPPERS: A Peer-to-Peer Lookup Service over Arbitrary Topology," IEEE, Twenty-Second Annual Joint Conference of the IEEE Computer and Communications Societies, 2003, vol. 2, pp. 1250-1260.

Hunt, et al., "Network Dispatcher: A Connection Router for Scalable Internet Services," Proceedings of the Seventh International World Wide Web Conference, <URL:http://www.unizh.ch/home/mazzo/reports/www7conf/fullpapers/1899/com1899.htm>, 1998, pp. 14.

Kaufman, et al., "DoS Protection for UDP-Based Protocols," ACM conference on Computer and communications security, 2003, pp. 2-7.

Lee, et al., "On the Detection of Signaling DoS Attacks on 3G Wireless Networks," IEEE International Conference on Computer Communications, 2007, pp. 1289-1297.

Liebergeld, et al., "Cellpot: A Concept for Next Generation Cellular Network Honeypots," Internet Society, 2014, pp. 1-6.

Ling, et al., "A Content-Based Resource Location Mechanism in PeerIS," IEEE, 2002, pp. 279-288.

Long, et al., "ID-Based Threshold Decryption Secure Against Adaptive Chosen-Ciphertext Attack," Computers and Electrical Engineering, 2007, vol. 33, pp. 166-176.

Mutz, "Linux Encryption HOWTO," http://encryptionhowto.sourceforge.net/Encryption-HOWTO.html, 2000, pp. 49.

Network- vs. Host-Based Intrusion Detection, A Guide to Intrusion Detection Technology, Internet Security Systems [online], <URL:http://documents.iss.net/whitepapers/nvh-ids.pdf>, 1998. pp. 10.

Obimbo, et al., "A Parallel Algorithm for Determining the Inverse of a Matrix for Use in Blockcipher Encryption/Decryption," J. Supercomput, 2007, vol. 39, pp. 113-130.

Oracle Corporation, Oracle Intelligent Agent User's Guide, Releas 9.2.0, Part No. A96676-01, 2002, pp. 36.

Popek, et al., "Encryption and Secure Computer Networks," Computer Surveys, 1979, vol. 11 (4), pp. 331-356.

SOL11243: iRules Containing the Rule-INIT iRule Event do not Re-Initialize when a Syntax Error is Corrected, F5 Support, 2010, p. 1.

Spatscheck, et al., "Optimizing TCP Forwarder Performance," IEEE/ACM Transactions on Networking, 2000, vol. 8 (2), pp. 146-157.

Thanasegaran, et al., "Simultaneous Analysis of Time and Space for Conflict Detection in Time-Based Firewall Policies," IEEE International Conference on Computer and Information Technology, 2010, pp. 1015-1021.

* cited by examiner

IMPLEMENTING AND OPTIMIZING SECURE SOCKET LAYER INTERCEPT

This present application is a continuation and claims the benefit of U.S. patent application Ser. No. 14/622,840, titled "Implementing and Optimizing Secure Socket Layer Intercept," and filed Feb. 14, 2015, now U.S. Pat. No. 10,063,591, the disclosure of which is incorporated by reference herein in its entirety.

TECHNICAL FIELD

This disclosure relates generally to computer and network security and, more particularly, to implementing and optimizing secure socket layer (SSL) intercept.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

An SSL is a cryptographic protocol designed for providing communication security over the Internet. The SSL uses asymmetric cryptography for authenticating a counterparty with which the SSL is communicating, symmetric encryption for confidentiality, and message authentication codes for message integrity. The SSL is widely used for instant messaging and Voice over Internet Protocol, and in applications such as browsing, e-mail, Internet faxing, and others.

Firewall, Intrusion Prevention System (IPS) and Intrusion Detection System (ID S) security appliances usually can only inspect plain text traffic or clear text traffic and have difficulties inspecting the SSL traffic because data packets of the SSL traffic are encrypted. Thus, traditional Packet Capture forensic tools may not be effective when inspecting SSL traffic. Without the ability to inspect SSL traffic, confidential information may be compromised and content can be infected with the help of malware and botnets. Some security appliances have internal SSL decryption/encryption support to inspect incoming and outgoing traffic for security threats. However, such appliances normally use one device for both incoming and outgoing data traffic. This takes its toll on the performance of the device as decryption and encryption of the SSL traffic requires complicated and time- and resource-consuming computations. Therefore, inspection of the SSL traffic for malware, extracted data, or hidden threats by such device may be unsatisfactory.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for intercepting encrypted data packets. Specifically, a system for intercepting encrypted data packets may include a first device and a second device. The first device may serve a client-side data traffic associated with a client device and the second device may serve a server-side data traffic associated with a server. The first device may be configured to intercept at least one encrypted data packet. The first device may be further configured to decrypt the at least one encrypted packet to produce at least one decrypted data packet. The first device may provide the at least one decrypted data packet to one or more monitoring devices for inspection of the at least one decrypted data packet. The second device may be configured to receive, from the one or more monitoring devices, the at least one decrypted data packet. The second device may be further operable to re-encrypt the at least one decrypted data packet to produce the at least one encrypted data packet.

According to another approach of the present disclosure, there is provided a method for intercepting encrypted data packets. The method may commence with intercepting, by a first device serving a client-side data traffic associated with a client device, at least one encrypted data packet. The method may continue with decrypting, by the first device, the at least one encrypted packet to produce at least one decrypted data packet. The method may include providing, by the first device, the at least one decrypted data packet to one or more monitoring devices for inspection of the at least one decrypted data packet. The method may further include receiving, by a second device serving a server-side data traffic associated with a server, the at least one decrypted data packet from the one or more monitoring devices. The at least one decrypted data packet may be re-encrypted, by the second device, to produce the at least one encrypted data packet.

In further example embodiments of the present disclosure, the method operations are stored on a machine-readable medium comprising instructions, which, when implemented by one or more processors, perform the recited operations. In yet further example embodiments, hardware systems or devices can be adapted to perform the recited operations. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
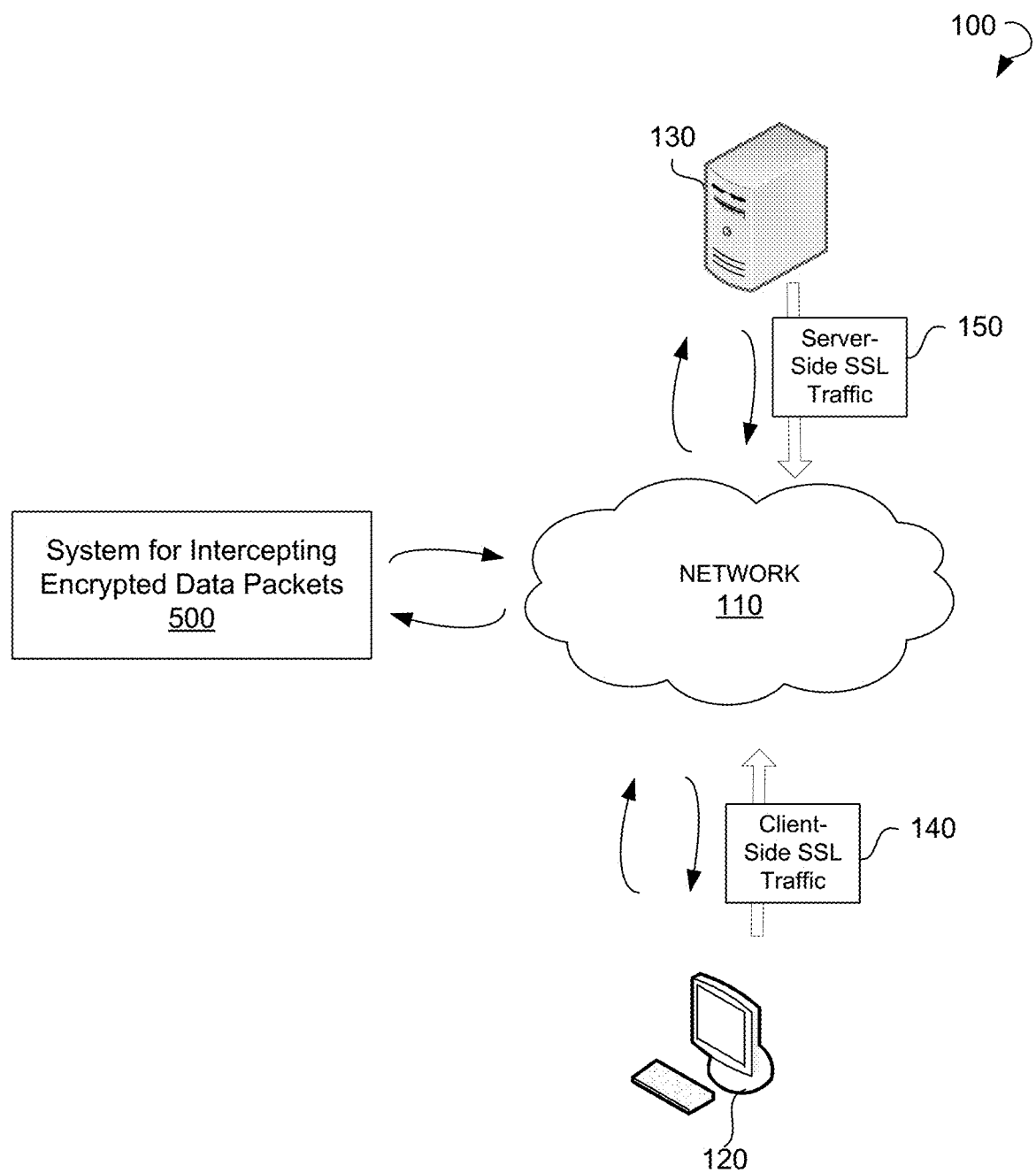
FIG. 1 shows an environment, within which methods and systems for intercepting encrypted data packets can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, tablet computer, laptop computer), game console, handheld gaming device, cellular phone, smart phone, smart television system, and so forth.

As outlined in the summary, the embodiments of the present disclosure are directed to intercepting encrypted data packets. A system for intercepting encrypted data packets can be responsible for intercepting and inspecting encrypted data packets communicated between a client and a server. The system may distribute the load caused by the decryption and encryption of SSL traffic between several devices. According to the present disclosure, a client may access a server using the SSL. The client-side SSL traffic can be intercepted by a first device. A decision as to whether to trigger an interception of the SSL traffic can be made based on either Transmission Control Protocol (TCP) port number (443) or more generic SSL traffic detection methods. The first device may intercept the SSL traffic using wildcard Virtual Internet Protocol (VIP) address. Upon interception of the client-side SSL traffic, the first device may decrypt the client-side SSL traffic to produce clear text traffic. As used herein, "clear text" is the form of a message or data, which is sent or stored without cryptographic protection in a form that is understandable without additional processing.

Port translation can be used to allow the first device to notify the second device that the SSL traffic was intercepted. More specifically, the first device can perform a TCP port 443 translation, and the encrypted traffic from TCP port 443 can become the clear text traffic to a configurable port having an unused port number, such as port 8080. Thus, the second device can receive an indication that the SSL traffic is intercepted and needs to be re-encrypted. The clear text traffic may be sent by the first device to a monitoring device for inspection. The monitoring device can receive the clear text traffic from the first device and inspect the received clear text traffic for security threats. The monitoring device may use conventional procedures for inspection of the clear text traffic. Upon inspection, in absence of any security threats, the monitoring device may send the inspected clear text traffic to a second device. The second device may receive the clear text traffic from the monitoring device and encrypt the clear text traffic to produce the SSL traffic. After encryption, the second device may send the SSL traffic to the server.

Upon receiving and processing of the SSL traffic, the server may send an encrypted response, i.e., server-side SSL traffic, to the client. The server-side SSL traffic can be intercepted by the second device. The second device can also use the wildcard VIP address to intercept the server-side SSL traffic. Upon interception of the server-side SSL traffic, the second device may decrypt the server-side SSL traffic to produce clear text traffic. The clear text traffic may be sent by the second device to the monitoring device for inspection. The monitoring device can receive the clear text traffic from the second device and inspect the received clear text traffic for security threats. Upon inspection, in absence of any security threats, the monitoring device may send the inspected clear text traffic to the first device. The first device may receive the clear text traffic from the monitoring device and encrypt the clear text traffic to produce the SSL traffic. After the encryption, the first device may send the SSL traffic to the client. Therefore, the client-side SSL traffic can be handled by the first device and the server-side SSL traffic can be processed by the second device. Thus, the optimal performance of SSL communication between the client and the server is provided by distributing the computation-sensitive SSL traffic processing between two devices, namely the first device and the second device.

Furthermore, Firewall, IPS, IDS, and other security vendors can easily insert their security devices, namely monitoring devices, in the middle of each client-server and server-client connections. In particular, a monitoring device can be placed between the first device and the second device. Thus, a security device can be used without any modifications unaware of the SSL to clear text conversions.

Referring now to the drawings, FIG. 1 illustrates an environment 100 within which methods and systems for intercepting encrypted data packets can be implemented. The environment 100 may include a network 110, a client 120, a server 130, and a system 500 for intercepting encrypted data packets. The client 120 may include a network machine or a network resource that sends client-side SSL traffic 140 to the server 130. The server 130, in turn, may send server-side SSL traffic 150 to the client 120. The client 120 and the server 130 may communicate with each other using the network 110.

The network 110 may include the Internet or any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (FireWire) connection, a Fiber Channel connection, an IrDA (infrared) port, a Small Computer Systems Interface connection, a USB (Universal Serial Bus) connection or other wired or wireless, digital or analog interface or connection, mesh or Digi® networking. The network 110 may include a network of data processing nodes that are interconnected for the purpose of data communication.

The system 500 may intercept both the client-side SSL traffic 140 and the server-side SSL traffic 150, perform encryption and decryption steps, and inspect the decrypted traffic for security threats as described in further detail below.

Figure 2:
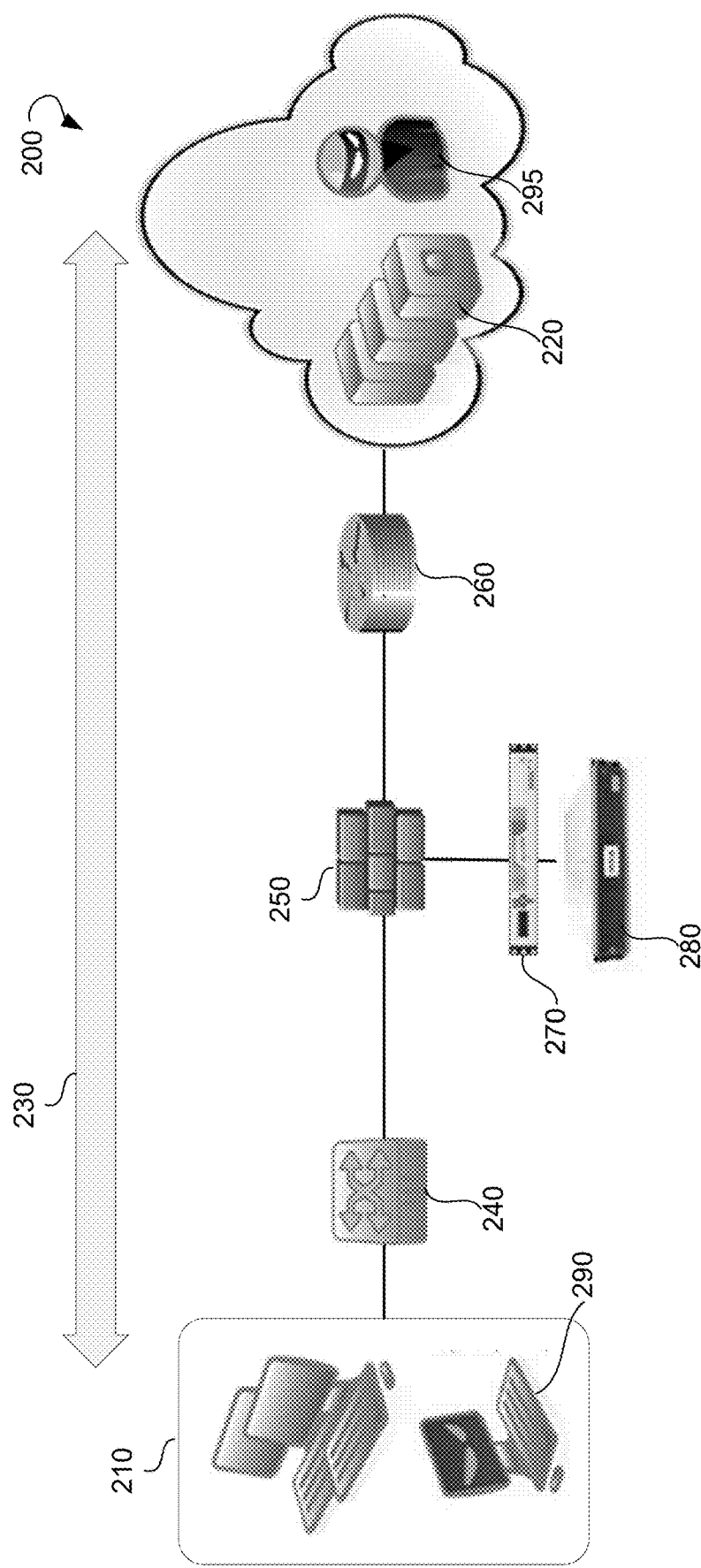
FIG. 2 is a schematic diagram showing SSL communications between a client and a server.

FIG. 2 is a schematic diagram 200 of SSL communications between clients and servers. Clients 210 and servers 220 may communicate with each other using an SSL encrypted connection 230. The outgoing traffic, or requests, of the clients 210 may be directed by a switch 240 located within a client network to a firewall 250. Similarly, the incoming traffic, or responses, of the servers 220, may be directed by a router 260 to the firewall 250. The firewall 250 may control the incoming traffic and the outgoing traffic based on predetermined criteria. The firewall 250 may not allow passage of data packets that do not match the predetermined criteria. The firewall 250 may send the requests of the clients 210 and the responses of the servers 220 to monitoring devices 270, 280. The monitoring devices 270, 280 may be responsible for malware detection and security forensics investigations related to the data packets of the incoming traffic and the outgoing traffic. However, when the incoming traffic or the outgoing traffic is the SSL traffic, i.e., is encrypted, neither the firewall 250, nor the monitoring devices 270, 280 can inspect the incoming traffic or the outgoing traffic. Therefore, both on a client side and a server side, attackers 290, 295 may take advantage of the fact that SSL traffic is not inspected and may send malicious data packets.

Figure 3:
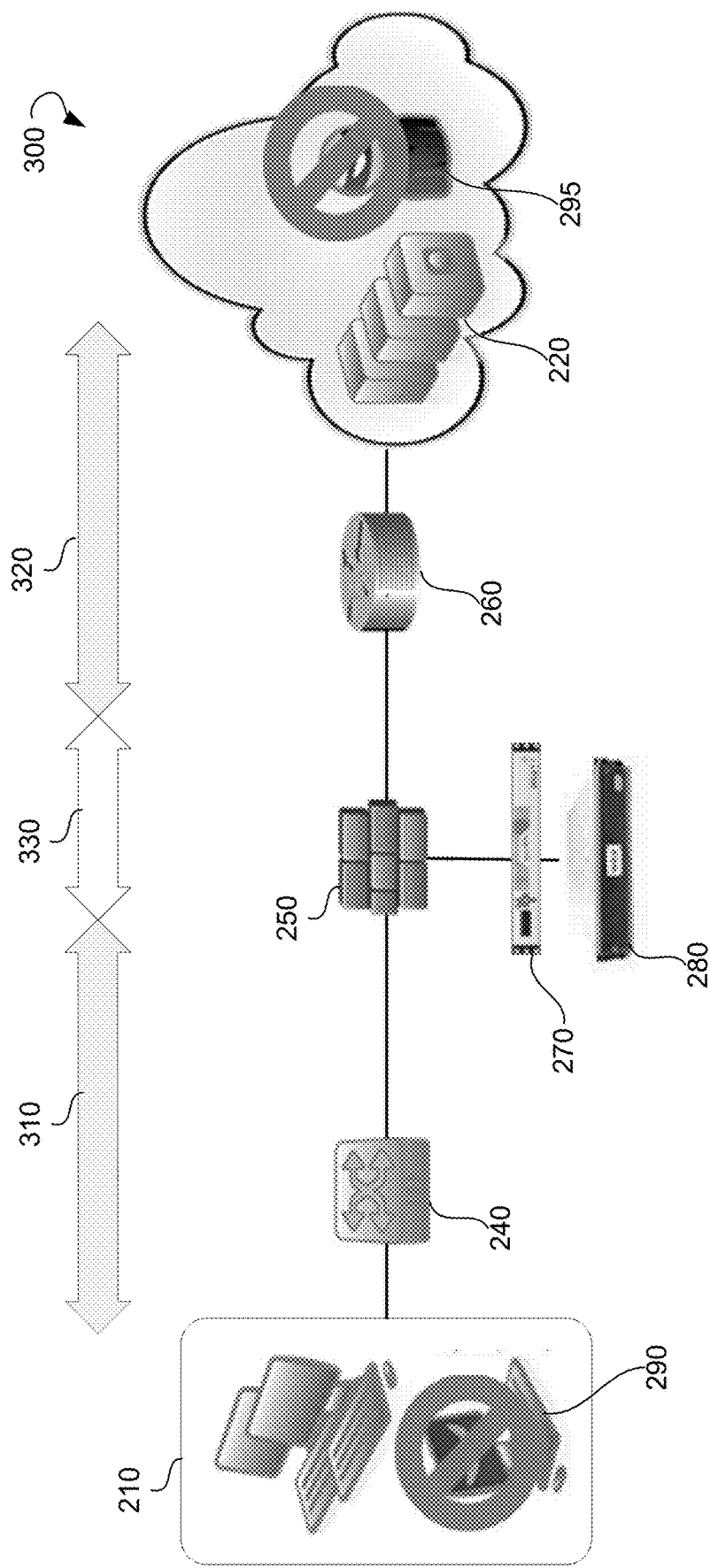
FIG. 3 is a schematic diagram showing interception of SSL communications between a client and a server.

FIG. 3 is a schematic diagram 300 of interception of SSL communications between clients and servers. In order to facilitate detection of malicious data packets in the incoming traffic and the outgoing traffic, the SSL encrypted connection between the clients 210 and the servers 220 may include a client-side SSL encrypted connection 310, and a server-side SSL encrypted connection 320. Specifically, the clients 210 may send the outgoing traffic to the servers 220 using the client-side SSL encrypted connection 310. Similarly, the servers 220 may send the incoming traffic to the clients 210 using the server-side SSL encrypted connection 320. Both the outgoing traffic and the incoming traffic may be intercepted and decrypted into clear text 330 for further inspection by the firewall 250 or the monitoring devices 270, 280.

Figure 4:
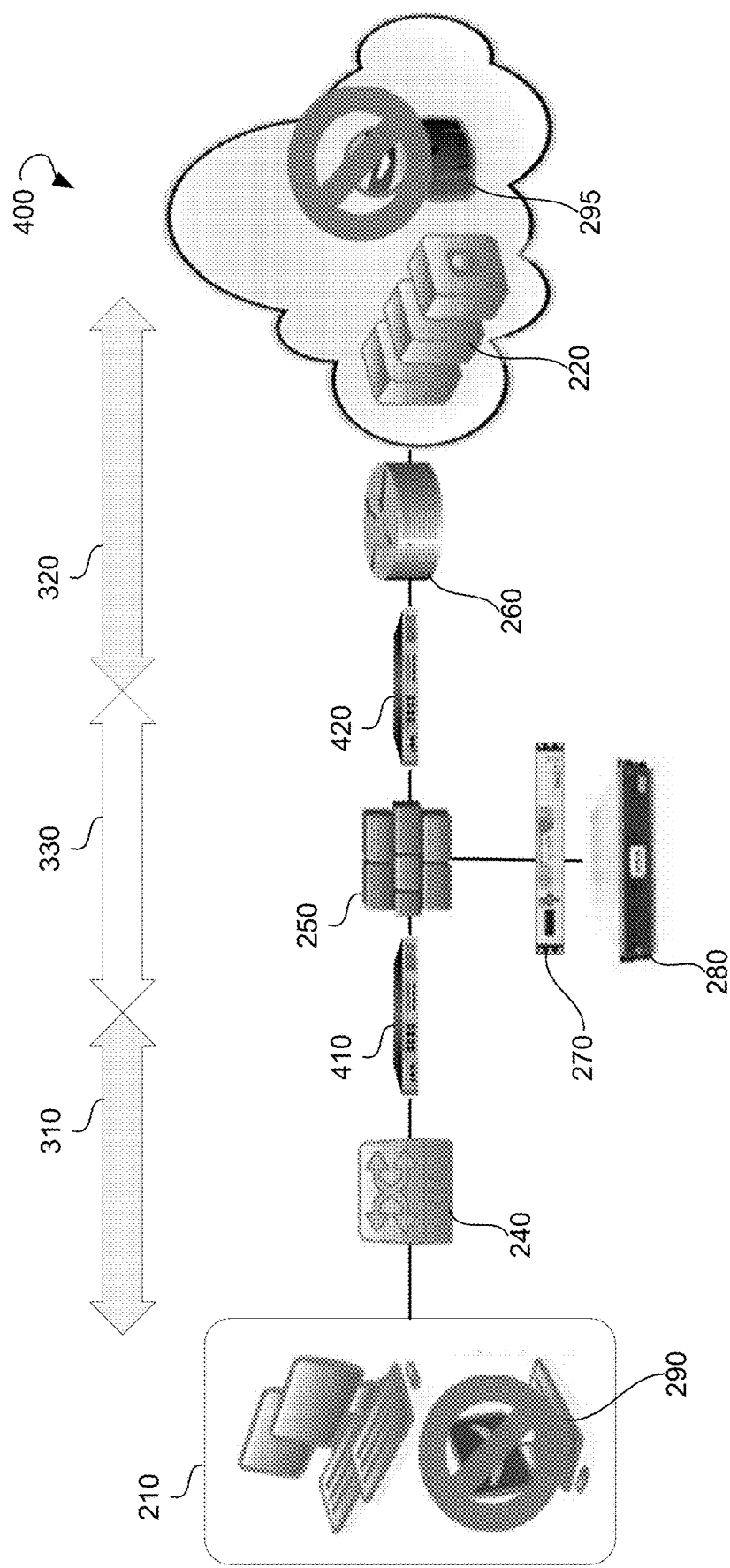
FIG. 4 is a schematic diagram showing interception of SSL communications between a client and a server.

FIG. 4 is a schematic diagram 400 of interception of SSL communication between clients and servers by a system for intercepting encrypted data packets. The system for intercepting encrypted data packets may include a first device 410 and a second device 420. In some example embodiments, the monitoring devices 270, 280 may also be included into the system for intercepting encrypted data packets. The clients 210 may send the outgoing traffic to the servers 220 using the client-side SSL encrypted connection 310. The outgoing traffic of the clients 210 may be directed by the switch 240 located in a client network to the first device 410. The first device 410 may receive the outgoing traffic of the clients 210 and decrypt the outgoing traffic of the clients 210. In an example embodiment, the decrypted traffic may be in the form of clear text 330. The first device 410 may send the clear text 330 to the monitoring devices 270, 280 for inspection for malware or botnets. Upon inspection of the clear text 330, the monitoring devices 270, 280 may send the clear text 330 to the second device 420. The second device 420 may receive the clear text 330 and encrypt the clear text 330 to provide the encrypted outgoing traffic of the clients 210. The second device 420 may further send the encrypted outgoing traffic of the clients 210 to the servers 220.

Similarly, the servers 220 may send the incoming traffic to the clients 210 using the server-side SSL encrypted connection 320. The incoming traffic of the servers 220 may be directed by the router 260 to the second device 420. The second device 420 may receive the incoming traffic from the servers 220 and decrypt the incoming traffic. In an example embodiment, the decrypted traffic may be in the form of the clear text 330. The second device 420 may send the clear text 330 to the monitoring devices 270, 280 for inspection for malware or botnets. Upon inspection of the clear text 330, the monitoring devices 270, 280 may send the clear text 330 to the first device 410. The first device 410 may receive the clear text 330 and encrypt the clear text 330 to provide the encrypted incoming traffic from the servers 220. The first device 420 may further send the encrypted incoming traffic to the clients 210.

Figure 5:
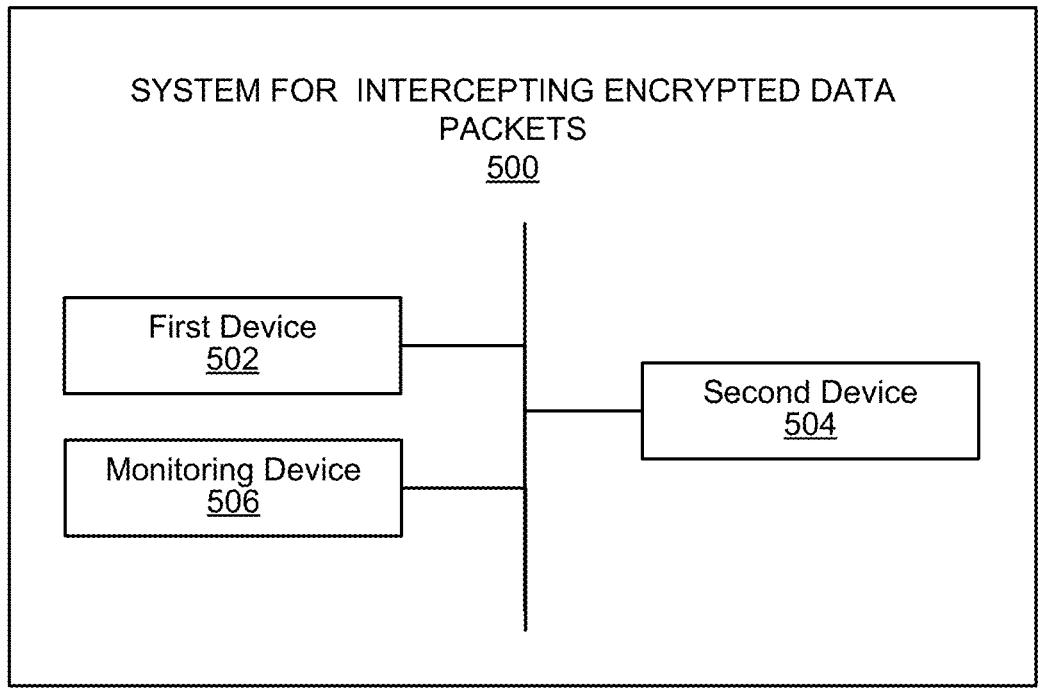
FIG. 5 is a block diagram illustrating a system for intercepting encrypted data packets.

FIG. 5 shows a block diagram illustrating various modules of an example system 500 for intercepting encrypted data packets. Specifically, the system 500 may include a first device 502, a second device 504, and a monitoring device 506. The first device 502 may be operable to intercept at least one encrypted data packet forwarded by at least one client device of an organization to a server. The at least one data packet may be intercepted by the first device 502 using a wildcard VIP address. In an example embodiment, in order for the client device to trust the first device 502, an interception proxy authority certificate can be installed on the at least one client device by the organization to enable secure communications between the at least one client device and the first device 502. In fact, the organization may install the interception proxy authority certificate on all client devices within an organization network to ensure trusted communications between the client devices and the first device. The interception proxy authority certificates may be installed in local root stores associated with the client devices.

In an example embodiment, the at least one encrypted data packet is encrypted according to an SSL protocol. The first device 502 may be further operable to decrypt the at least one encrypted packet. As a result of decryption, at least one decrypted data packet may be produced. In an example embodiment, the at least one decrypted data packet includes a clear text. The first device 502 may be operable to provide the at least one decrypted data packet to the monitoring device 506.

The monitoring device 506 may include at least one of the following: a firewall, an IPS, an IDS, and so forth. The monitoring device 506 may be operable to inspect the at least one decrypted data packet received from the first device 502. The inspection of the at least one decrypted data packet can be performed based on predetermined criteria. In an example embodiment, the predetermined criteria include inspections for malware or botnets. The monitoring device 506 may be operable to provide the inspected decrypted data packet to the second device 504.

The second device 504 may be operable to receive the at least one decrypted data packet from the monitoring device 506. The second device 504 may be further operable to re-encrypt the at least one decrypted data packet. As a result of re-encryption, the at least one encrypted data packet may be produced. The second device 504 may send the at least one encrypted data packet to the server. In an example embodiment, the second device 504 is further operable to replace a secure certificate associated with the server to enable secure communications between the second device 504 and the server.

In a further example embodiment, an organization may want, for example, for budget reasons, to perform SSL traffic inspection using one device instead of two devices. In this case, the first device and the second device may run on different partitions of a third device.

Thus, by using the first device 502 for decryption and the second device 504 for encryption, in view of time- and resource-consuming computations required for decryption and encryption, the system 500 may queue the performance of the SSL communication between the client and the server. Furthermore, the first device 502 and the second device 504 can provide inspection of SSL traffic from both sides: from the client to the server and from the server to the client.

Additionally, in the case when the monitoring device 506 is a third-party monitoring device, the third-party monitoring device can be readily interconnected between the first device 502 and the second device 504. That means that security devices of firewall, IPS, IDS, or other security vendors can be deployed in the middle between the first device 502 and the second device 504. The clear text traffic can be provided to the monitoring device 506, as well as from the monitoring device 506. Therefore, no decryption or encryption is performed by the monitoring device 506.

Figure 6:
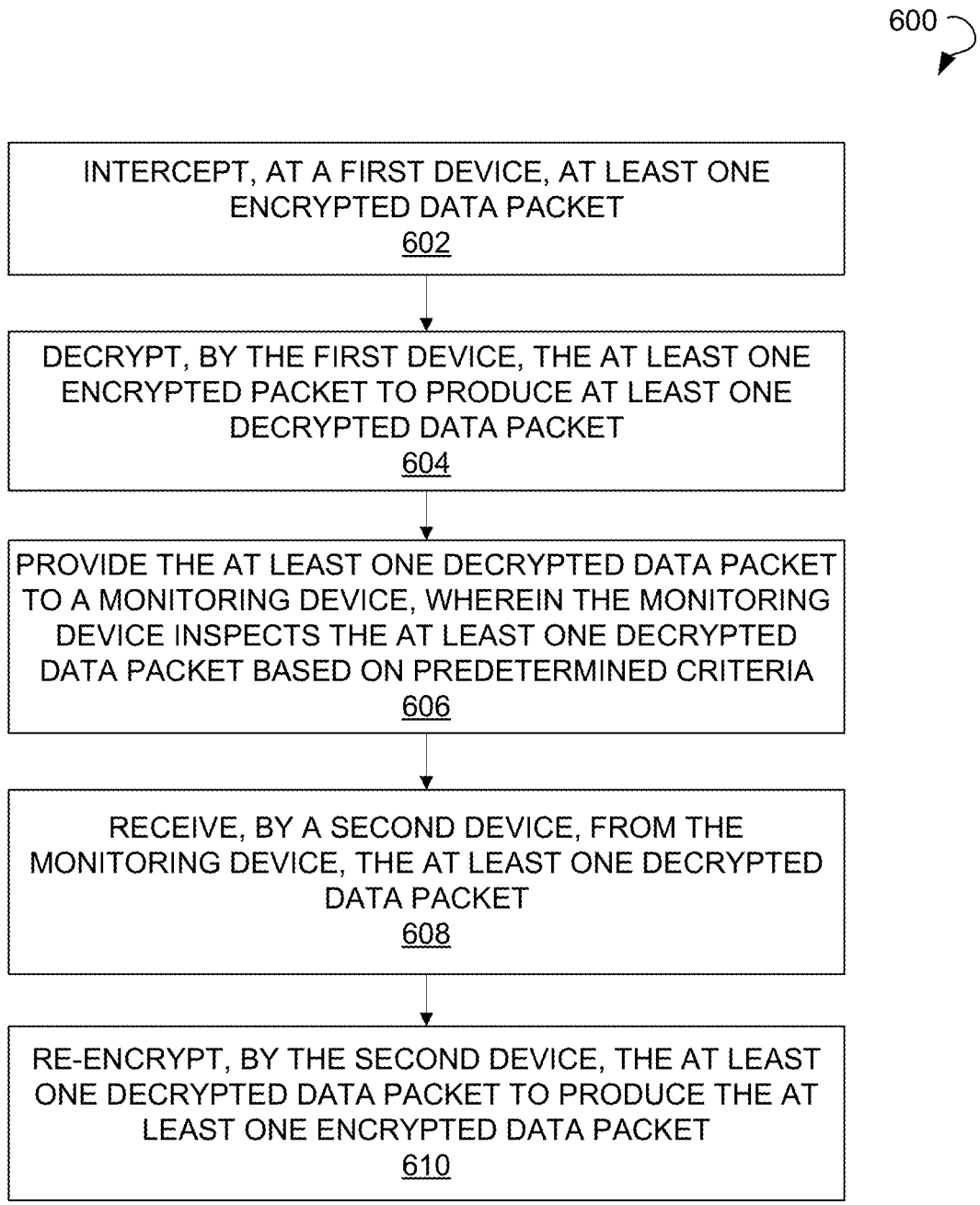
FIG. 6 is a process flow diagram of a method for intercepting encrypted data packets.

FIG. 6 shows a process flow diagram of a method 600 for intercepting encrypted data packets, according to an example embodiment. In some embodiments, the operations may be combined, performed in parallel, or performed in a different order. The method 600 may also include additional or fewer operations than those illustrated. The method 600 may be performed by processing logic that may comprise hardware (e.g., decision making logic, dedicated logic, programmable logic, and microcode), software (such as software run on a general-purpose computer system or a dedicated machine), or a combination of both.

The method 600 may commence with intercepting, by a first device, at least one encrypted data packet at operation 602. The at least one data packet may be intercepted using a wildcard VIP address. In an example embodiment, the at least one encrypted data packet is received from at least one client device of an organization. In a further example embodiment, an interception proxy authority certificate is installed on the at least one client device by the organization to enable secure communications between the at least one client device and the first device. The at least one encrypted data packet may be encrypted according to an SSL protocol. Upon interception of the at least one encrypted data packet, the at least one encrypted packet may be decrypted by the first device at operation 604. As a result of decryption, at least one decrypted data packet may be produced. In an example embodiment, the at least one decrypted data packet includes clear text.

The at least one decrypted data packet may be provided to a monitoring device at operation 606. In an example embodiment, the monitoring device includes at least one of the following: a firewall, an IPS, an IDS, and so forth. The monitoring device may inspect the at least one decrypted data packet based on predetermined criteria. In an example embodiment, the predetermined criteria include inspections for malware or botnets.

At operation 608, a second device may receive the at least one decrypted data packet from the monitoring device. Upon receiving of the decrypted data packet, the second device may re-encrypt the at least one decrypted data packet at operation 610. As a result of re-encryption, the at least one encrypted data packet may be produced. The second device may forward the encrypted data packet to the server.

The method 600 may optionally comprise replacing, by the second device, a secure certificate associated with the server to enable secure communication between the second device and the server. In a further example embodiment, the first device and the second device run on different partitions of a third device.

In a further example embodiment, the method 600 may include determining the necessity of interception an encrypted data packet or providing the encrypted data packet directly to the server. The determining may be based on a Server Name Indication (SNI). The SNI is known to be an extension to the SSL protocol, by which a client indicates which host name the client is attempting to connect to at the start of the handshaking procedure. The first device may check the database for the SNI associated with the client. The SNI may be present in a "Client Hello" message sent by the client. Based on the checking, in case the SNI is marked as trusted in the database, the first device may bypass the encrypted data packet to the server without interception. If the SNI is absent from the database, the first device may intercept the encrypted data packet.

In a further example embodiment, in case the server requests for the certification of the client, the encrypted data packet from the server may be sent without interception. Furthermore, in some embodiments, the client certificate authentication may be parsed.

Figure 7:
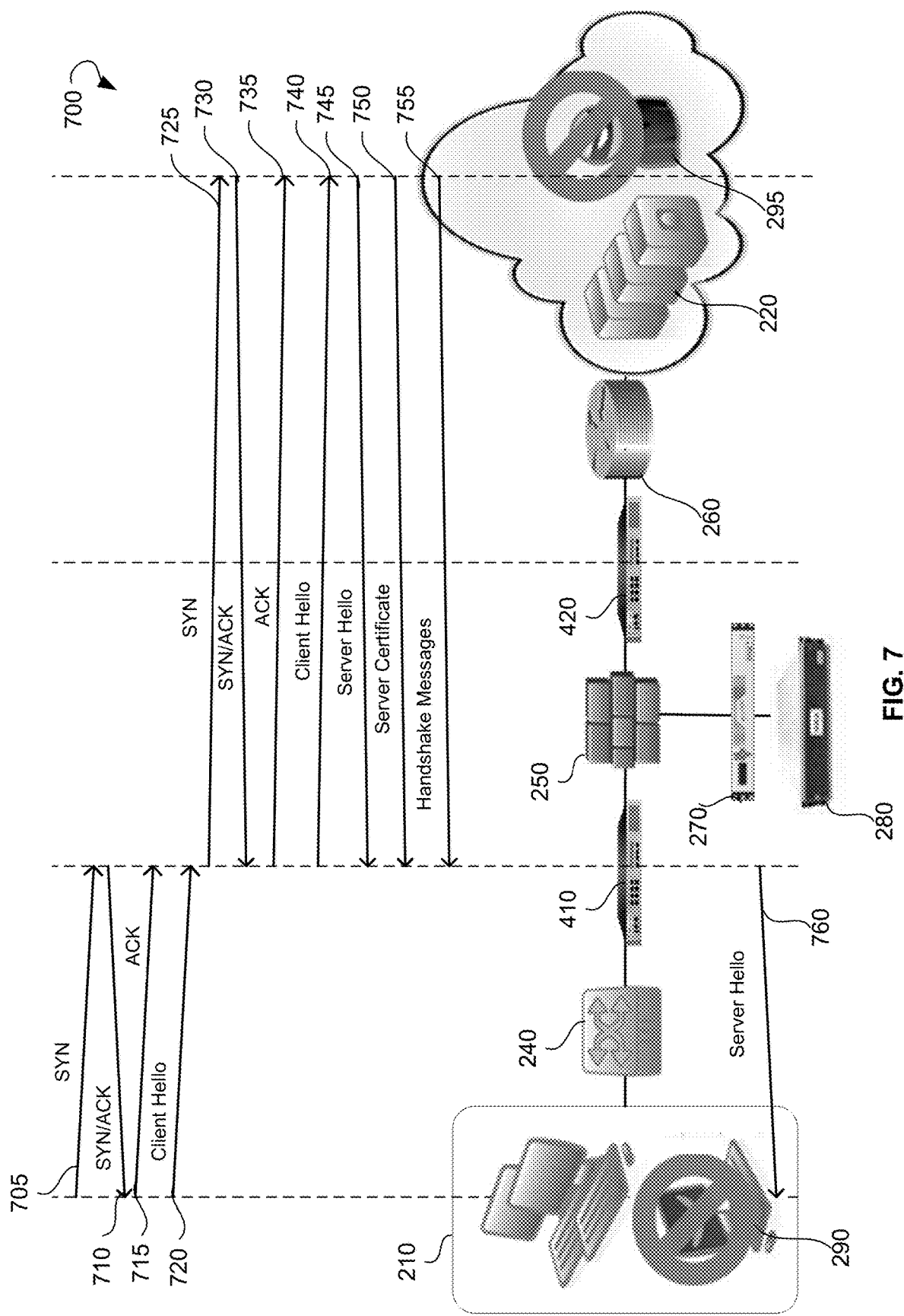
FIG. 7 is a diagram illustrating SSL interception packet flow.

FIG. 7 is a diagram 700 illustrating SSL interception packet flow, according to an example embodiment. Typically, an SSL session between the client and the server commences with a handshake procedure that includes a process of negotiation that dynamically sets parameters of a communications channel established between the client and the server. The establishment of the SSL session with interception of the packet flow is described in further detail below.

According to an example embodiment, a client 210 sends a "SYNchronize" message 705 to a first device 410. The first device 410 receives the "SYNchronize" message 705 from the client 210 and sends a "SYNchronize-ACKnowledgement" message 710 to the client 210. The client 210 receives the "SYNchronize-ACKnowledgement" message 710 from the first device 410 and sends an "ACKnowledgement" message 715 to the first device 410. The client 210 further sends a "Client Hello" message 720 to the first device 410.

Upon receiving the "Client Hello" message 720 from the client 210, the first device 410 checks whether a certificate associated with the server 220 is present in a database. The database can save the certificates based on the Internet Protocol address, port number, and SNI of the server 220. Upon determining that the certificate is missing in the database, the first device 410 sends a "SYNchronize" message 725 to a server 220. The second device 420 receives the "SYNchronize" message 725 from the first device 410 and sends a "SYNchronize-ACKnowledgement" message 730 to the first device 410. The first device 410 receives the "SYNchronize-ACKnowledgement" message 730 from the second device 420 and sends an "ACKnowledgement" message 735 to the server 220. The first device 410 can further send a "Client Hello" message 740 to the server 220. In response to receiving the "Client Hello" message 740, the server 220 sends a "Server Hello" message 745 to the first device 410. The server 220 can further send a "Server Certificate" message 750 that includes a certificate of the server 220. Furthermore, the server 220 sends other messages 755 stipulated by a handshake procedure to the first device 410. Upon receiving all handshake messages 755 from the server 220, the first device 410 sends a "Server Hello" message 760 to the client 210.

Furthermore, in an example embodiment, before sending the "Server Hello" message 760 to the client 210, the first device 410 may "fake", i.e., replace, the certificate associated with the server 220 and received in the "Server Certificate" message 750 with another certificate. The certificate associated with the server 220 may be inserted into the cache by the first device 410. In other words, the certificate that the client 210 gets from the first device 410 is different from the certificate provided by the server 220 to the first device 410. In an example embodiment, the certificate replacement procedure is performed within a network of the organization. By using the certificate replacement procedure, the organization may be able to monitor which type of traffic is initiated from clients inside the network of the organization to servers outside the network of the organization.

In an example embodiment, the replacement of the certificate of the server is performed as follows. An issuer name of the certificate may be replaced with SSL intercept Certification Authority (CA) name. The public key can be replaced with SSL intercept CA public key. Most of the certificate extensions are removed. Subject alternative name is the only extension kept. Further, the certificate can be signed with SSL intercept CA private key.

Figure 8:
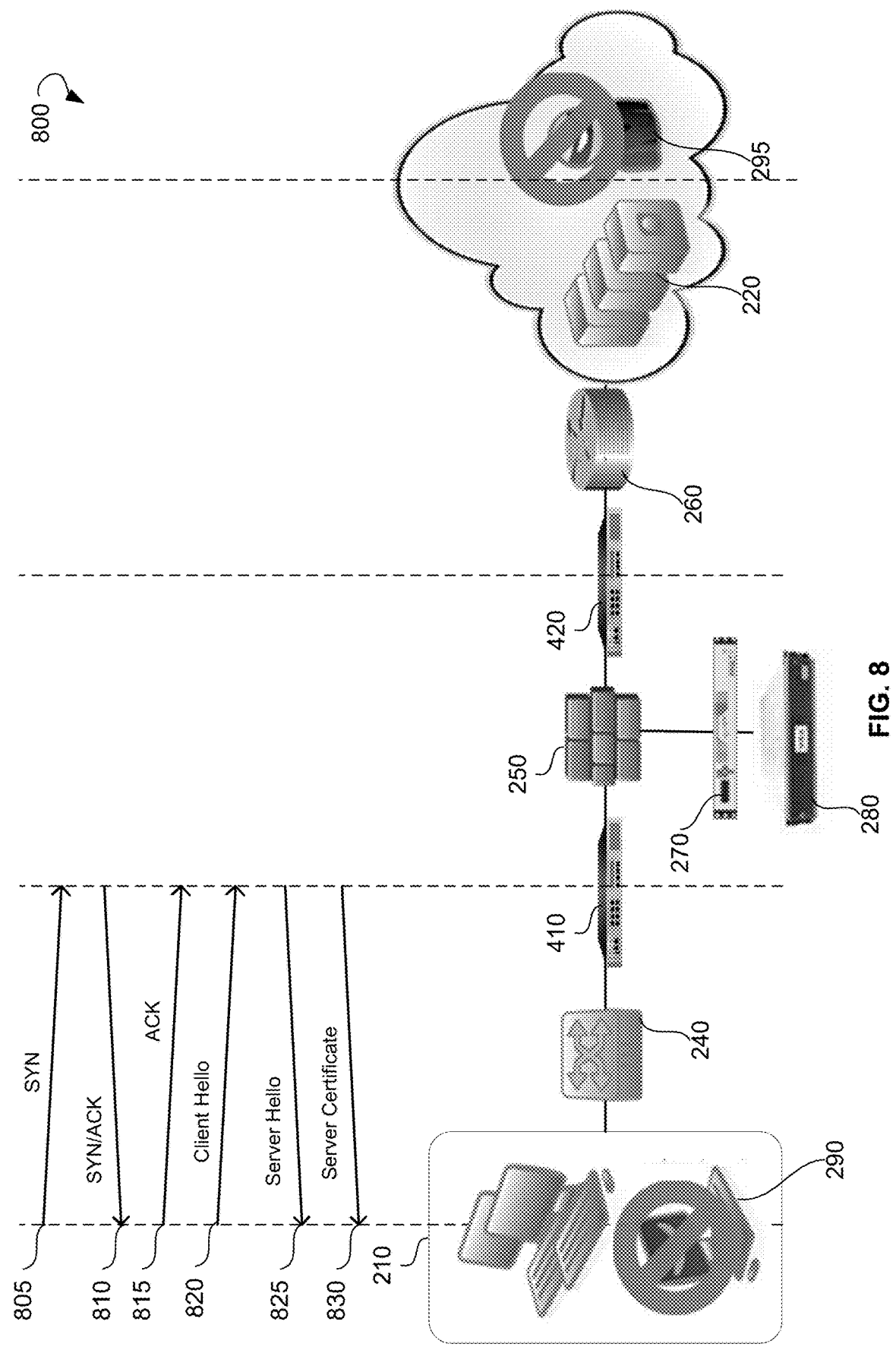
FIG. 8 is a diagram illustrating SSL interception packet flow.

FIG. 8 is a diagram 800 illustrating SSL interception packet flow, according to an example embodiment. A client 210 sends a "SYNchronize" message 805 to a first device 410. The first device 410 receives the "SYNchronize" message 805 from the client 210 and sends a "SYNchronize-ACKnowledgement" message 810 to the client 210. The client 210 receives the "SYNchronize-ACKnowledgement" message 810 from the first device 410 and sends an "ACKnowledgement" message 815 to the first device 410. The client 210 further sends a "Client Hello" message 820 to the first device 410.

Upon receiving the "Client Hello" message 820 from the client 210, the first device 410 checks whether a certificate associated with the server 220 is present in a database. The database can save the certificates based on the Internet Protocol address, port number, and SNI of the server 220. Upon determining that the certificate is present in the database, the first device 410 sends a "Server Hello" message 825 to the client 210 according to the handshake procedure. Furthermore, the first device 410 may "fake", i.e., replace, the certificate associated with the server 220 with another certificate and insert another certificate into a "Server Certificate" message 830. In other words, the first device 210 does not use the certificate of the server 220 present in the database, but inserts another certificate into the "Server Certificate" message 830. The first device 410 can send the "Server Certificate" message 830 to the client 210. In other words, the certificate that the client 210 gets in the "Server Certificate" message 830 from the first device 410 is different from the certificate associated with the server 220 and stored in the database.

Figure 9:
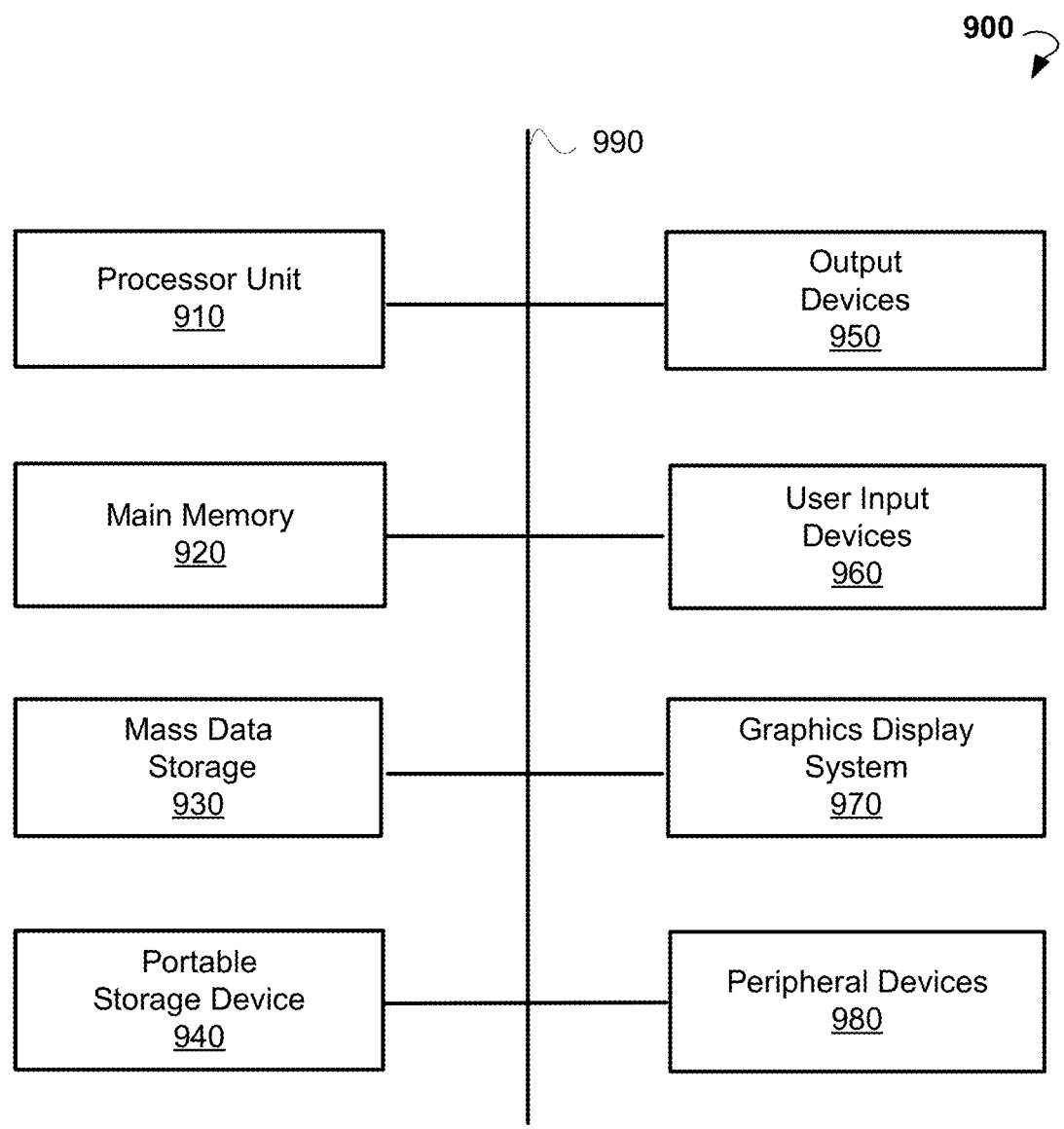
FIG. 9 shows a diagrammatic representation of a computing device for a machine, within which a set of instructions for causing the machine to perform any one or more of the methodologies discussed herein can be executed.

FIG. 9 illustrates an example computer system 900 that may be used to implement embodiments of the present disclosure. The computer system 900 may serve as a computing device for a machine, within which a set of instructions for causing the machine to perform any one or more of the methodologies discussed herein can be executed. The computer system 900 can be implemented in the contexts of the likes of computing systems, networks, servers, or combinations thereof. The computer system 900 includes one or more processor units 910 and main memory 920. Main memory 920 stores, in part, instructions and data for execution by processor 910. Main memory 920 stores the executable code when in operation. The computer system 900 further includes a mass data storage 930, portable storage medium drive(s) 940, output devices 950, user input devices 960, a graphics display system 970, and peripheral devices 980. The methods may be implemented in software that is cloud-based.

The components shown in FIG. 9 are depicted as being connected via a single bus 990. The components may be connected through one or more data transport means. Processor unit 910 and main memory 920 are connected via a local microprocessor bus, and mass data storage 930, peripheral device(s) 980, portable storage device 940, and graphics display system 970 are connected via one or more I/O buses.

Mass data storage 930, which can be implemented with a magnetic disk drive, solid state drive, or an optical disk drive, is a non-volatile storage device for storing data and instructions for use by processor unit 910. Mass data storage 930 stores the system software for implementing embodiments of the present disclosure for purposes of loading that software into main memory 920.

Portable storage device 940 operates in conjunction with a portable non-volatile storage medium, such as a floppy disk, CD, DVD, or USB storage device, to input and output data and code to and from the computer system 900. The system software for implementing embodiments of the present disclosure is stored on such a portable medium and input to the computer system 900 via the portable storage device 940.

User input devices 960 provide a portion of a user interface. User input devices 960 include one or more microphones, an alphanumeric keypad, such as a keyboard, for inputting alphanumeric and other information, or a pointing device, such as a mouse, a trackball, stylus, or cursor direction keys. User input devices 960 can also include a touchscreen. Additionally, the computer system 900 includes output devices 950. Suitable output devices include speakers, printers, network interfaces, and monitors.

Graphics display system 970 includes a liquid crystal display or other suitable display device. Graphics display system 970 receives textual and graphical information and processes the information for output to the display device.

Peripheral devices 980 may include any type of computer support device to add additional functionality to the computer system.

The components provided in the computer system 900 of FIG. 9 are those typically found in computer systems that may be suitable for use with embodiments of the present disclosure and are intended to represent a broad category of such computer components that are well known in the art. Thus, the computer system 900 can be a personal computer, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory (CD-ROM) disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 900 may be implemented as a cloud-based computing environment, such as a virtual machine operating within a computing cloud. In other embodiments, the computer system 900 may itself include a cloud-based computing environment, where the functionalities of the computer system 900 are executed in a distributed fashion. Thus, the computer system 900, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 900, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for intercepting encrypted data packets have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for intercepting encrypted data packets, the system comprising:
a first device serving a client-side data traffic associated with a client device, the first device being a hardware device configured to:
intercept at least one encrypted data packet;
decrypt the at least one encrypted packet to produce at least one decrypted data packet; and
provide the at least one decrypted data packet to one or more monitoring devices for inspection of the at least one decrypted data packet, wherein the providing of the at least one decrypted data packet to the one or more monitoring devices includes:
providing the at least one decrypted data packet to a firewall, the firewall filtering incoming data packets and outgoing data packets using predetermined criteria, wherein the firewall is configured to filter the at least one decrypted data packet, wherein the firewall includes:
a first monitoring device of the one or more monitoring devices, the first monitoring device being configured to inspect the at least one decrypted data packet to determine whether the at least one decrypted data packet includes a malware; and
a second monitoring device of the one or more monitoring devices, the second monitoring device being configured to inspect the at least one decrypted data packet to determine whether the at least one decrypted data packet includes a botnet;
wherein the at least one decrypted data packet is forwarded by the firewall to the first monitoring device and the second monitoring device; and
a second device serving a server-side data traffic associated with a server, the first device and the second device being separate hardware devices, the second device being a hardware device configured to:
receive, from the one or more monitoring devices, the at least one decrypted data packet, wherein the receiving the at least one decrypted data packet by the second device from the one or more monitoring devices includes:
receiving, by the second device, the at least one decrypted data packet from the firewall, the at least one decrypted data packet being received by the firewall from one of the first monitoring device and the second monitoring device upon the inspection; and
re-encrypt the at least one decrypted data packet to produce the at least one encrypted data packet.

2. The system of claim 1, wherein the at least one encrypted data packet is encrypted according to a Secure Socket Layer (SSL) protocol.

3. The system of claim 1, wherein the at least one encrypted data packet is received from the client device of an organization.

4. The system of claim 3, wherein an interception proxy authority certificate is installed on the client device by the organization to enable secure communications between the client device and the first device.

5. The system of claim 1, wherein the second device is further configured to replace a secure certificate associated with the server to enable secure communication between the second device and the server.

6. The system of claim 1, wherein the one or more monitoring devices are configured to perform one or more of the following: inspect the at least one decrypted data packet to determine whether the at least one decrypted data packet includes a malware and inspect the at least one decrypted data packet to determine whether the at least one decrypted data packet includes a botnet.

7. The system of claim 1, wherein the first device and the second device run on different partitions of a third device.

8. The system of claim 1, wherein the at least one decrypted data packet includes a clear text.

9. A method for intercepting encrypted data packets, the method comprising:
- intercepting, by a first device serving a client-side data traffic associated with a client device, at least one encrypted data packet;
- decrypting, by the first device, the at least one encrypted packet to produce at least one decrypted data packet;
- providing, by the first device, the at least one decrypted data packet to one or more monitoring devices for inspection of the at least one decrypted data packet, wherein the providing of the at least one decrypted data packet to the one or more monitoring devices includes:
  - providing the at least one decrypted data packet to a firewall, the firewall filtering incoming data packets and outgoing data packets using predetermined criteria, wherein the firewall is configured to filter the at least one decrypted data packet, wherein the firewall includes:
    - a first monitoring device of the one or more monitoring devices, the first monitoring device being configured to inspect the at least one decrypted data packet to determine whether the at least one decrypted data packet includes a malware; and
    - a second monitoring device of the one or more monitoring devices, the second monitoring device being configured to inspect the at least one decrypted data packet to determine whether the at least one decrypted data packet includes a botnet;
  - wherein the at least one decrypted data packet is forwarded by the firewall to the first monitoring device and the second monitoring device;
- receiving, by a second device serving a server-side data traffic associated with a server, from the one or more monitoring devices, the at least one decrypted data packet, the first device and the second device being separate hardware devices, wherein the receiving the at least one decrypted data packet by the second device from the one or more monitoring devices includes:
  - receiving, by the second device, the at least one decrypted data packet from the firewall, the at least one decrypted data packet being received by the firewall from one of the first monitoring device and the second monitoring device upon the inspection; and
- re-encrypting, by the second device, the at least one decrypted data packet to produce the at least one encrypted data packet.

10. The method of claim 9, wherein the at least one encrypted data packet is encrypted according to an SSL protocol.

11. The method of claim 9, wherein the at least one decrypted data packet comprises an indication that the at least one decrypted data packet requires re-encryption, wherein the re-encrypting of the at least one decrypted data packet by the second device is based on the indication.

12. The method of claim 11, wherein an interception proxy authority certificate is installed on the client device to enable secure communications between the client device and the first device.

13. The method of claim 9, further comprising replacing, by the second device, a secure certificate associated with the server to enable secure communication between the second device and the server.

14. The method of claim 9, wherein the one or more monitoring devices include at least one of the following: an intrusion prevention system and an intrusion detection system.

15. The method of claim 9, wherein the first device and the second device run on different partitions of a third device.

16. The method of claim 9, wherein the at least one data packet is intercepted using a wildcard virtual Internet Protocol address.

17. A system for intercepting encrypted data packets, the system comprising:
- a first device serving a client-side data traffic associated with a client device, the first device being a hardware device configured to:
  - intercept at least one encrypted data packet;
  - decrypt the at least one encrypted packet to produce at least one decrypted data packet; and
  - provide the at least one decrypted data packet to a firewall, the firewall filtering incoming data packets and outgoing data packets using predetermined criteria, wherein the firewall is configured to filter the at least one decrypted data packet, wherein the firewall includes:
    - a first monitoring device of the one or more monitoring devices, the first monitoring device being configured to inspect the at least one decrypted data packet to determine whether the at least one decrypted data packet includes a malware; and
    - a second monitoring device of the one or more monitoring devices, the second monitoring device being configured to inspect the at least one decrypted data packet to determine whether the at least one decrypted data packet includes a botnet;
  - wherein the at least one decrypted data packet is forwarded by the firewall to the first monitoring device and the second monitoring device for inspection of the at least one decrypted data packet; and
- a second device serving a server-side data traffic associated with a server, the second device being a hardware device configured to:
  - receive the at least one decrypted data packet from the firewall, the at least one decrypted data packet being received by the firewall from one of the first monitoring device and the second monitoring device upon the inspection; and
  - re-encrypt the at least one decrypted data packet to produce the at least one encrypted data packet.

* * * * *